US012743796B2

(12) United States Patent
Chumerin et al.

(10) Patent No.: US 12,743,796 B2
(45) Date of Patent: Sep. 22, 2026

(54) METHOD FOR CALCULATING INFORMATION RELATIVE TO A RELATIVE SPEED BETWEEN AN OBJECT AND A CAMERA, A CONTROL METHOD FOR A VEHICLE, A COMPUTER PROGRAM, A COMPUTER-READABLE RECORDING MEDIUM, AN OBJECT MOTION ANALYSIS SYSTEM AND A CONTROL SYSTEM

(71) Applicants: TOYOTA MOTOR EUROPE, Brussels (BE); KATHOLIEKE UNIVERSITEIT LEUVEN, Leuven (BE)

(72) Inventors: Nikolay Chumerin, Brussels (BE); Marc Proesmans, Leuven (BE)

(73) Assignees: TOYOTA JIDOSHA KABUSHIKI KAISHA, Toyota (JP); KATHOLIEKE UNIVERSITEIT LEUVEN, Leuven (BE)

( * ) Notice: Subject to any disclaimer, the term of this patent is extended or adjusted under 35 U.S.C. 154(b) by 656 days.

(21) Appl. No.: 18/019,195

(22) PCT Filed: Aug. 4, 2020

(86) PCT No.: PCT/EP2020/071861

§ 371 (c)(1),
(2) Date: Feb. 1, 2023

(87) PCT Pub. No.: WO2022/028673

PCT Pub. Date: Feb. 10, 2022

(65) Prior Publication Data

US 2023/0289983 A1 Sep. 14, 2023

(51) Int. Cl.
*G06T 7/269* (2017.01)
*G06T 7/246* (2017.01)
(Continued)

(52) U.S. Cl.
CPC .............. *G06T 7/269* (2017.01); *G06T 7/248* (2017.01); *G08G 1/16* (2013.01); *B60W 10/06* (2013.01);
(Continued)

(58) Field of Classification Search
CPC ..................... G06T 7/269; G06T 7/248; G06T 2207/30261; G06T 2207/10016;
(Continued)

(56) References Cited

U.S. PATENT DOCUMENTS

2008/0046181 A1* 2/2008 Koike .................... G06V 20/58 701/301

FOREIGN PATENT DOCUMENTS

CN 101453557 A 6/2009

OTHER PUBLICATIONS

Shen, Xi, et al. "RANSAC-Flow: generic two-stage image alignment." arXiv e-prints (2020): arXiv-2004 (Year: 2020).*
Kawakami, Tomoya et. al. "Estimation of rotation and divergence from optical flow constraint." 2008 International Conference on Control, Automation and Systems. IEEE, 2008 (Year: 2008).*
(Continued)

*Primary Examiner* — Andrew M Moyer
*Assistant Examiner* — Dylan John Mendez Muniz
(74) *Attorney, Agent, or Firm* — Dinsmore & Shohl LLP

(57) ABSTRACT

A computer-implemented method for calculating information relative to a relative speed between an object and a camera, based on two images of the object acquired by the camera. The method comprises: determining a value of an optical flow between the two images; and, altogether with or after the determination of the value the optical flow, determining at least one parameter of the transformation, using the optical flow; and calculating information relative to a relative speed between the object and the camera, based on said at least one parameter of the transformation.

12 Claims, 3 Drawing Sheets

(51) Int. Cl.

| | |
|---|---|
| ***G08G 1/16*** | (2006.01) |
| *B60W 10/06* | (2006.01) |
| *B60W 10/18* | (2012.01) |
| *B60W 10/20* | (2006.01) |
| *B60W 60/00* | (2020.01) |

(52) U.S. Cl.

CPC ............. *B60W 10/18* (2013.01); *B60W 10/20* (2013.01); *B60W 60/001* (2020.02); *B60W 2420/403* (2013.01); *B60W 2554/804* (2020.02); *B60W 2710/06* (2013.01); *B60W 2710/18* (2013.01); *B60W 2710/20* (2013.01); *G06T 2207/30261* (2013.01)

(58) Field of Classification Search

CPC ........ G08G 1/16; B60W 10/06; B60W 10/18; B60W 10/20; B60W 60/001; B60W 2420/403; B60W 2554/804; B60W 2710/06; B60W 2710/18; B60W 2710/20

See application file for complete search history.

(56) References Cited

OTHER PUBLICATIONS

O'Donovan, Peter. "Optical flow: Techniques and applications." International Journal of Computer Vision 1 (2005): 26. (Year: 2005).*

Tomoya Kawakami et al: Estimation of rotation and divergence from optical flow constraint, Control, Automation and Systems, 2008. ICCAS 2008. International Conference on, IEEE, Piscataway, NJ, USA, Oct. 14, 2008 (Oct. 14, 2008), pp. 2538-2542, XP031367669, DOI: 10.1109/ICCAS.2008.4694282 ISBN: 978-89-950038-9-3 abstract, sections 1-4, Fi gs. 1-7.

Peter O' Donovan: "Optical Fl ow: Techniques and Applications", Apr. 6, 2005 (Apr. 6, 2005), XP055164912, Retrieved from the Internet: URL:http://www.dgp.toronto.edu/-donovan/stabilization/opticalflow.pdf [retrieved on Jan. 26, 2015] abstract, sections 1-7, Figs. 1-7.

International Search Report dated May 30, 2021; International Application No. PCT/EP2020/071861.

* cited by examiner

FIG.1

METHOD FOR CALCULATING INFORMATION RELATIVE TO A RELATIVE SPEED BETWEEN AN OBJECT AND A CAMERA, A CONTROL METHOD FOR A VEHICLE, A COMPUTER PROGRAM, A COMPUTER-READABLE RECORDING MEDIUM, AN OBJECT MOTION ANALYSIS SYSTEM AND A CONTROL SYSTEM

CROSS REFERENCE TO RELATED APPLICATION

This application is a National Stage of International Application PCT/EP2020/071861 filed on Aug. 4, 2020, the entire contents of which are hereby incorporated by reference.

TECHNICAL FIELD

The present disclosure mainly concerns a method for estimating the speed of objects detected in sequences of images outputted by one or more cameras. By extension, it also concerns the control of vehicles using relative speed information estimated by this method.

BACKGROUND ART

When a vehicle is moving, detecting independently moving objects moving around the vehicle is of utmost importance for safely driving the vehicle. Estimating the relative speed of these objects relative to the vehicle is also of course of extreme importance.

This relative speed can often be determined by radars mounted on the vehicle.

However, in case the moving object is not in the field of acquisition of the radars of the vehicle, or in case one of these radars has a breakdown, it may be necessary to use an alternative method to obtain information on a relative speed between the vehicle and a mobile object moving around the vehicle.

Accordingly, there is a need for a method and a device capable of providing information about a relative speed between an object and a vehicle, in particular when such information cannot be supplied by a radar of the vehicle.

SUMMARY OF THE DISCLOSURE

The present disclosure has been conceived in view of the above problem of the prior art, and a first object of the present disclosure is therefore to propose a method for calculating information relative to a relative speed between an object and 'an observer' (which can be for instance a vehicle, but the observer can be more generally any stationary observer of a scene), which method would not rely on a radar.

According to the present disclosure, a computer-implemented method for calculating information relative to a relative speed between an object and a camera is proposed.

This method is based on an initial image $I_k$ and a final image $I_{k+1}$ of the object, derived from image frames outputted by the camera, and comprises the steps of:

S41) determining a value of an optical flow between the initial image and the final image, the optical flow defining, for pixels of the initial image, an estimated motion thereof during a transformation transforming the initial image into the final image; and, altogether with or after the determination of the value the optical flow, determining at least one parameter of the transformation, using the optical flow; and

S42) calculating information relative to a relative speed between the object and the camera, based on said at least one parameter of the transformation.

The information relative to the relative speed between the vehicle and the object can be for instance a value indicating whether the detected object is moving away or toward the vehicle; it can be a relative velocity in depth of the detected object relative to the vehicle; a time to collision with the detected vehicle; or a relative acceleration (in depth) of the detected object relative to the vehicle; etc.

In the method according to the present disclosure, the information relative to a relative speed between the object and the camera can be calculated based not only on a single value of said at least one parameter of the transformation, but on a plurality of values of said at least one parameter of the transformation. In this case, this plurality of values can be calculated by performing step S41 a plurality of times so as to obtain a plurality of estimates of the parameter(s) of the transformation (step S41 is then performed for a plurality of pairs of images, each pair of images comprising an initial image and a final image); and calculating the information relative to the relative speed based on said plurality of estimates of the parameter(s) of the transformation.

Advantageously, the method uses only a very cheap and common sensor: a camera.

The method only uses a pair of images based on a pair of frames outputted by the camera to calculate information relative to a relative speed between the object and the camera. This pair of frames from which the initial image and the final image are derived normally consists of two frames acquired at two different time points by the camera (k refers here to the number of the frame, in the sequences of images outputted by the camera).

Importantly, in the method of the present disclosure, the initial image can represent the object, in time, either before or after the final image: the order of these two images (with respect to time) does not matter.

The method does not use the whole frames outputted by the camera, but only the parts of these frames which represent the object whose relative speed is to be estimated.

Therefore, a preliminary step consists in extracting, from the pair of frames, the two images (the 'sub-images', or 'patches') representing the object in the two frames. These two sub-images or patches are the initial image and the final image on which the method relies.

In accordance with the present disclosure, it has been observed that information relative to the relative speed between the object and the camera can be calculated using the optical flow, in (at least) two steps. As well known in the art, the optical flow consists in the coordinates of motion vectors (u, v) whose coordinates define the motion of pixels (x, y) in the transformation transforming the initial image into the final image. The optical flow is therefore defined by the function F, in the following optical flow equation:

$$(u,v)=F(x,y)$$

The object of interest (e.g. a vehicle) is detected and its bounding box is determined in each of the successive frames using an object detection algorithm. Several such detection algorithms are well known, for instance SSD, Yolo, AdaBoost etc.). The sub-images identified in this way and representing the object are cropped out from the frames using the bounding boxes which have been determined. Also recent advances in 3D object detection, for instance MonoDis, can be used as prior steps for the method. And also instance segmentation methods such as Mask-RCNN, can be used to make a distinction between background and foreground.

The observed object is assumed to be rigid and consequently, its projected view in the image is subjected to a constrained transformation. In the more general or extreme case this could be represented by a perspective or affine transformation, but, especially for objects viewed at a large distance, this transformation may be represented by a similarity transformation, involving only a scaling (expansion) s and a translation (tx, ty).

Under these assumptions, the apparent motion (optical flow) (u, v) from the previous frame to the current frame of a pixel (x, y) representing an object can be expressed as:

$$(x, y) \rightarrow (x+u, y+v) = s \cdot (x, y) + (tx, ty), \text{ or}$$

$$\begin{cases} x+u = sx+tx \\ y+v = sy+ty \end{cases} \Leftrightarrow \begin{cases} u = (s-1)x+tx \\ v = (s-1)y+ty \end{cases}$$

Note, that expansion and translation in (1) are considered the same for all points of the patch. The value of the expansion s is normally close to 1, and the case of $s>1$ corresponds to an expanding (approaching) object, while the case of $0<s<1$ corresponds to a shrinking (departing) object.

Therefore, in an differential optical flow equation, (u, v) can be substituted as a function of s, tx and ty.

This can yield to different differential optical flow equations; in the case of the Horn-Schunck algorithm, such differential optical flow equation can be expressed as:

$$s \cdot (\nabla_x I \cdot x + \nabla_y I \cdot y) + tx \cdot (\nabla_x I) + ty \cdot (\nabla_y I) + (\nabla_t I - \nabla_x I \cdot x - \nabla_y I \cdot y) = 0.$$

in some embodiments, the present disclosure proposes a method in which this equation is evaluated for each point (x, y) within the patch, which provides an overdetermined system of equations for three variables s, tx and ty.

By solving the above equation for the full patch or a significant part of it, information about relative to a relative speed between the object and a camera can be obtained with a high accuracy.

The two steps S41 and S42 of the proposed method can be described as follows.

In S41, first, a value of the optical flow is determined for pixels of one of the initial or final image; and altogether with or after the determination of the value the optical flow, at least one parameter of the transformation is determined using the optical flow.

Here, the term 'using' means either that the optical flow is used as an input or as a variable intervening in the determination, during the determination of said parameter(s) of the transformation.

In this step, the parameter(s) of the transformation is or are determined altogether with or after the determination of the value the optical flow.

Then, in S42, based on the parameter(s) of the transformation which have been determined in the first step, information relative to a relative speed between the object and the camera is calculated.

Direct Method

A first embodiment defines a "direct method", which is so called because the parameter(s) of the transformation are calculated in one step (Step S412 below).

In this method, the step S41 comprises two sub-steps:

S411) determining the value of the optical flow between the two images; and, a transformed pixel being a pixel obtained by applying the transformation to a corresponding antecedent pixel, coordinates of a transformed pixel being therefore obtained by adding a value of the optical flow F for the corresponding antecedent pixel to coordinates of the corresponding antecedent pixel;

S412) solving a set of equations expressing the coordinates of transformed pixels as a function of the coordinates of corresponding antecedent pixels, using said at least one parameter of the transformation, and thereby determining said at least one parameter of the transformation.

During step S411, the optical flow can be calculated by any know method. The optical flow can be calculated for instance using the Lucas-Kanade algorithm, the Horn-Schunck algorithm, etc.

Then, based on the optical flow, the parameter(s) of the transformation is or are calculated during step S412. During this step, the set of equations can be solved for instance by robust fitting a linear model, for instance by a RANSAC method or an IRLS method (an "Iteratively Reweighted Least Squares" method).

Iterative Method

As an alternative to the direct method, in a second or alternative method, the parameter(s) of the transformation are calculated iteratively. In this method, the parameter(s) of the transformation and the optical flow are calculated altogether.

The iterative method is defined as follows:

A transformed pixel being a pixel obtained by applying the transformation to a corresponding antecedent pixel;

coordinates of a transformed pixel being therefore obtained by adding a value of the optical flow F for the corresponding antecedent pixel to coordinates of the corresponding antecedent pixel;

a first equation being an equation expressing the coordinates of a transformed pixel as a function of the coordinates of a corresponding antecedent pixel, using said at least one parameter of the transformation, and a second equation being an optical flow equation expressing, for a considered pixel, a relationship between spatio-temporal information about pixel intensities I at the considered pixel, spatio-temporal information about pixel intensities at another pixel which is offset from the considered pixel by an estimated offset value, and said at least one parameter of the transformation;

step S41 comprises executing an initial step of:

S415) determining initial value of said at least one parameter of the transformation and the optical flow;

step S41 further comprises iteratively executing the following steps:

S416) determining updated values of said at least one parameter of the transformation, by solving a set of second equations established for considered pixels of the initial image, based on an estimated value of the optical flow F for said considered pixels;

S417) determining whether a new iteration (of the algorithm) has to be performed; and,

S418) determining updated estimated values of the optical flow F for said considered pixels, using a set of first equations for said considered pixels and the values of the transformation parameter(s) determined at step S416.

Step S418 may be a conditional step, which is executed only if at step S417, it is determined that another iteration has to be performed.

The spatio-temporal information can include for instance spatio-temporal derivatives of the pixel intensities at the considered pixel.

At step S417, in some embodiments, it is determined that a new iteration of the algorithm has to be performed when it is determined that the difference between the updated values of the parameter(s) and previously calculated values of the parameter(s) is over a predetermined threshold.

Alternatively or additionally, in other embodiments it is determined that a new iteration of the algorithm has to be performed as long as (or only if) a maximum number of iterations $i_{max}$ has not be exceeded.

In this second method by contrast with the direct method, the optical flow F is not a freely defined 'per pixel flow field', but is rather defined by the transformation chosen to model the motion of the whole sub-image.

Accordingly, the optical flow F can be expressed by a function. Many different functions can be used.

For instance, in an embodiment the flow is expressed in terms of an expansion s and a displacement vector (tx, ty) between the centers of sub-images in consecutive frames. However, any other suitable expression can be chosen to model the optical flow F.

Advantageously, the parameter(s) of the transformation as identified with the present method such as the expansion rate, etc., have found to be numerically very stable—at least for small displacements—, even in the presence of noise, debayering or compression artefacts in the inputted images.

In this method, the values of the optical flow F for the pixels of the initial image are progressively estimated altogether with—and constrained by—the parameter(s) of the transformation, using an algorithm called 'bi-local algorithm'.

The bi-local algorithm is particularly adapted in cases where the values of the optical flow are large, that is, the motion of the pixels from the initial image to the final image is large. This algorithm can be implemented in a particularly efficient manner when an initial estimate of the optical flow can be derived from the former frames acquired by the camera.

In usual optical flow determination methods, the optical flow is determined based on the displacement between two images, by taking into account the spatio-temporal derivatives at a single location in the two images, assuming that the motion is small.

By contrast, the second method is a 'bi-local' method. The term bi-local means that the optical flow equations are now formulated to take into account the spatio-temporal information at two different locations in the images: the above-mentioned 'considered pixel' and the 'other pixel'.

The other pixel is obtained by shifting the 'considered pixel' of an estimated offset value. This offset value is calculated based on the current value of the optical flow; for instance, it can be equal to the current value of the optical flow.

Thanks to this feature, the second method can be used even in the case of large displacements from one frame to the next one.

It is not necessary of course to establish equations for all pixels (or combination of pixels) of the initial or final image. However, the higher the number of pixels used, the higher the accuracy is in the determination of the parameter(s) of the transformation.

In an embodiment, the set of second equations, for each of said considered pixels, expresses a relation between spatio-temporal information in the initial image at said considered pixel, and spatio-temporal information at said another pixel in the final image.

In an embodiment, wherein the transformation is a similarity defined by transformation parameters s, tx, and ty, the set of second equations is defined as:

$$s\cdot(\nabla'_x I\cdot x+\nabla'_y I\cdot y)+tx\cdot\nabla'_x I+ty\cdot\nabla'_y I+\nabla_t''I=0 \quad (2d')$$

in which for a current iteration I, bi-local spatial derivatives $\nabla_x'I$ and $\nabla_y'I$ and bi-local temporal derivatives $\nabla_t''I$ are defined as:

$$\nabla'_x I(x,y)=(\nabla_x I_k(x,y)+\nabla_x I_{k+1}(x+u_i,y+v_i))/2 \quad (2a)$$

$$\nabla'_y I(x,y)=(\nabla_y I_k(x,y)+\nabla_y I_{k+1}(x+u_i,y+v_i))/2 \quad (2b)$$

$$\nabla_t''I_k(x,y)=I_{k+1}(x+u_i,y+v_i)-I_k(x,y)-\nabla_x'I(x,y)\cdot x-\nabla_y'I(x,y)y \quad (2c)$$

in which $u_i$, $v_i$ are values of the optical flow F for the current iteration i.

The calculation methods according to the present disclosure (in particular, the direct and the iterative methods) can be implemented for a large variety of transformations. For instance, the transformation can be a perspective transformation, a similarity transformation combined with a translation, an affine transformation, a rotation of the rigid object combined with a translation.

Having calculated information relative to the relative speed between an object and the camera, at step S42, such information can be used for various purposes.

In a particularly interesting embodiment, this information is used to control at least one device, for instance at least one device of a vehicle.

For instance, the control method can comprise the steps of:

S10) acquiring camera images of the environment of at least one camera with said at least one camera;

S20) identifying an object in at least a pair of said camera images acquired by one of said at least one camera;

S30) extracting an initial image and a final image of the object, which are portions of said pair of camera images defined by a bounding box of said identified object;

S40) calculating information relative to a relative speed between an object and said at least one camera, using one of the above-defined methods;

S50) controlling said at least one vehicle device based on said information relative to the relative speed between the object and said at least one camera.

In a particular implementation, the proposed control method is determined by computer program instructions.

Accordingly, another purpose the present disclosure is to propose a computer program which is stored on a non-transitory computer-readable storage media, and which is suitable for being performed on a processor, the program including instructions adapted to perform the steps of the above-defined method when it is run on the processor.

The computer program may use any programming language, and be in the form of source code, object code, or code intermediate between source code and object code, such as in a partially compiled form, or in any other desirable form.

The processor mentioned above may be any data processing means, for instance a personal computer, an electronic control unit configured to be mounted in a car, etc.

The present disclosure also includes a computer-readable medium storing instructions that, when executed by a processor, cause the processor to perform the computer program mentioned above.

The computer-readable medium may be an entity or device capable of storing the program. For example, the computer-readable medium may comprise storage means, such as a read only memory (ROM), e.g. a compact disk (CD) ROM, or a microelectronic circuit ROM, or indeed magnetic recording means, e.g. a floppy disk or a hard disk.

Alternatively, the computer-readable medium may be an integrated circuit in which the program is incorporated, the circuit being adapted to execute or to be used in the execution of the control method in question.

Another object of the present disclosure is to propose an object motion analysis system. The object motion analysis system comprises an electronic control unit configured, based on an initial image and a final image of the object, derived from image frames outputted by the camera:

S41) to determine a value of an optical flow between the initial image and the final image, the optical flow defining, for pixels of the initial image, an estimated motion thereof during a transformation transforming the initial image into the final image; and, altogether with or after the determination of the value the optical flow, to determine at least one parameter of the transformation, using the optical flow; and

S42) to calculate information relative to a relative speed between the object and the camera, based on said at least one parameter of the transformation.

More broadly, the present disclosure encompasses an object motion analysis system comprising an electronic control unit, which electronic control unit is configured, based on an initial image and a final image of the object, derived from image frames outputted by the camera, to carry out one of the above-described methods.

In an embodiment, the electronic control unit is configured:

S411) to determine the value of the optical flow between the two images; and, a transformed pixel being a pixel obtained by applying the transformation to a corresponding antecedent pixel, coordinates of a transformed pixel being therefore obtained by adding a value of the optical flow F for the corresponding antecedent pixel to coordinates of the corresponding antecedent pixel;

S412) to solve a set of equations expressing the coordinates of transformed pixels as a function of the coordinates of corresponding antecedent pixels, using said at least one parameter of the transformation, and to determine thereby said at least one parameter of the transformation.

For instance, the electronic control unit can be configured to solve the set of equations by robust fitting a linear model, for instance by a RANSAC method or an IRLS method.

Alternatively, in an embodiment, and based on the above-presented definition of a first equation and a second equation, the electronic control unit is configured to execute an initial step of:

S415) determining initial values of said at least one parameter of the transformation and the optical flow;

the electronic control unit is further configured to iteratively execute the steps of:

S416) determining updated values of said at least one parameter of the transformation, by solving a set of second equations established for considered pixels of the initial image, and based on an estimated value of the optical flow F for said considered pixels;

S417) determining whether a new iteration has to be performed; and

S418) determining updated estimated values of the optical flow F for said considered pixels, using a set of first equations for said considered pixels and the values of the transformation parameter(s) determined at step S416.

The transformation can be in particular a perspective transformation, a similarity transformation combined with a translation, an affine transformation, a rotation of the rigid object combined with a translation.

The updated estimated values of the optical flow F for said considered pixel may be determined at step S418 only if at step 417, it has been determined that another iteration has to be performed.

The object motion analysis system can be integrated in particular in a control system, in particular an automated driving system for a vehicle.

In this case, the control system comprises at least one camera configured to acquire images; and the electronic control unit is configured:

S10) to acquire camera images of the environment of said at least one camera with said at least one camera;

S20) to identify an object in at least a pair of said camera images acquired by one of said camera(s);

S30) to extract an initial image and a final image of the object, which are portions of said pair of camera images defined by a bounding box of said identified object;

S40) to calculate information relative to a relative speed between an object and said at least one camera, using one of the above-defined methods; and

S50) to control at least one vehicle device of the automated control system based on said information relative to the relative speed between the object and said at least one camera.

BRIEF DESCRIPTION OF THE DRAWINGS

The present disclosure may be better understood and its numerous other objects and advantages will become apparent to those skilled in the art by reference to the accompanying drawing wherein like reference numerals refer to like elements in the several figures and in which:

FIG. 1 is a schematic drawing showing essentially of a car equipped with an automated driving system according to the present disclosure;

DESCRIPTION OF AN EXAMPLE EMBODIMENT

Figure 2:
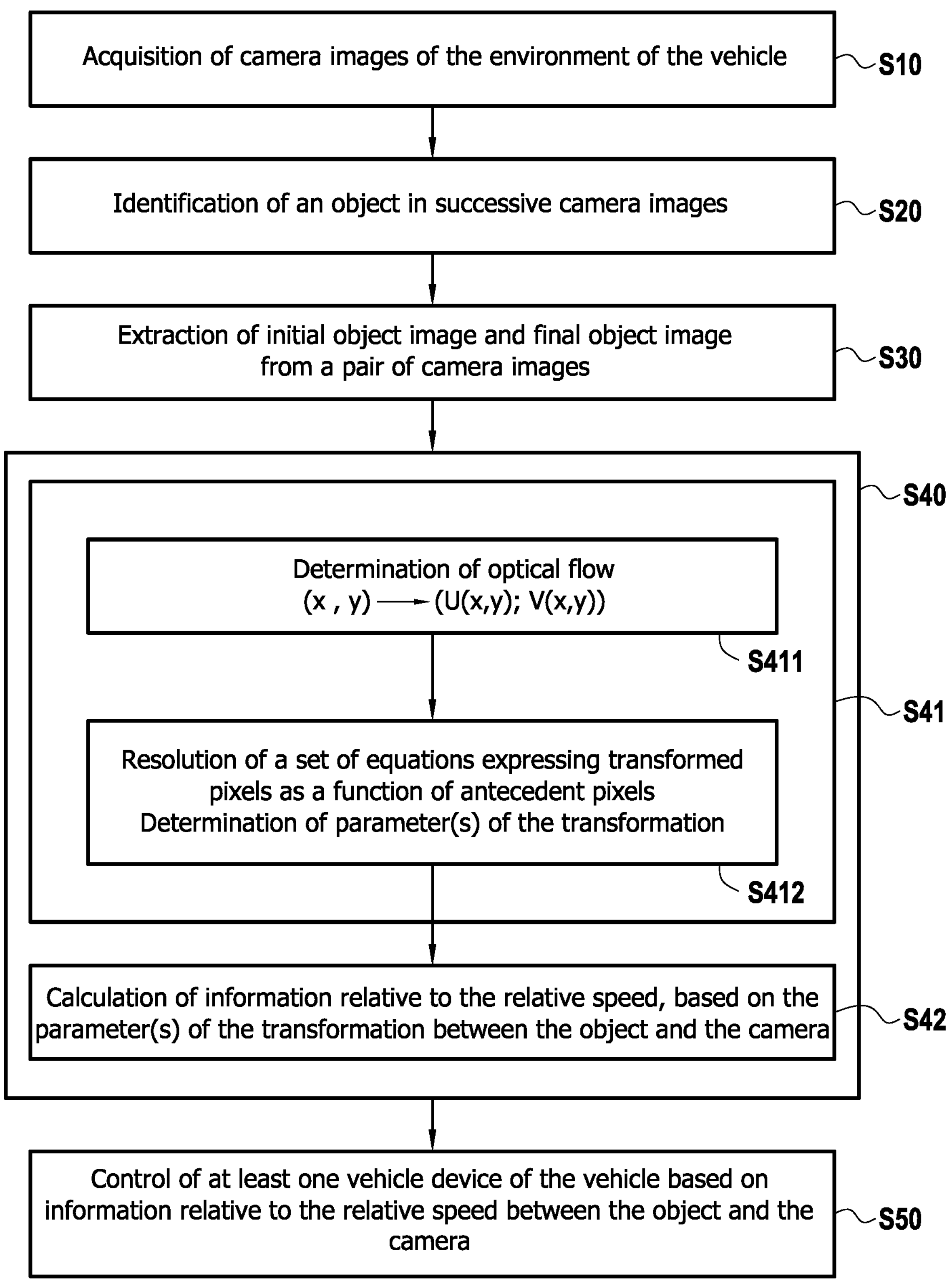
FIG. 2 is a block diagram showing steps of a method for determining information relative to a relative speed between a moving object and the camera of a vehicle according to a first embodiment of a method according to the present disclosure.

An automated driving system 10 (as an example of a control system according to the present disclosure) configured to implement the proposed method for controlling at least one device, is now going to be described.

Figure 1:
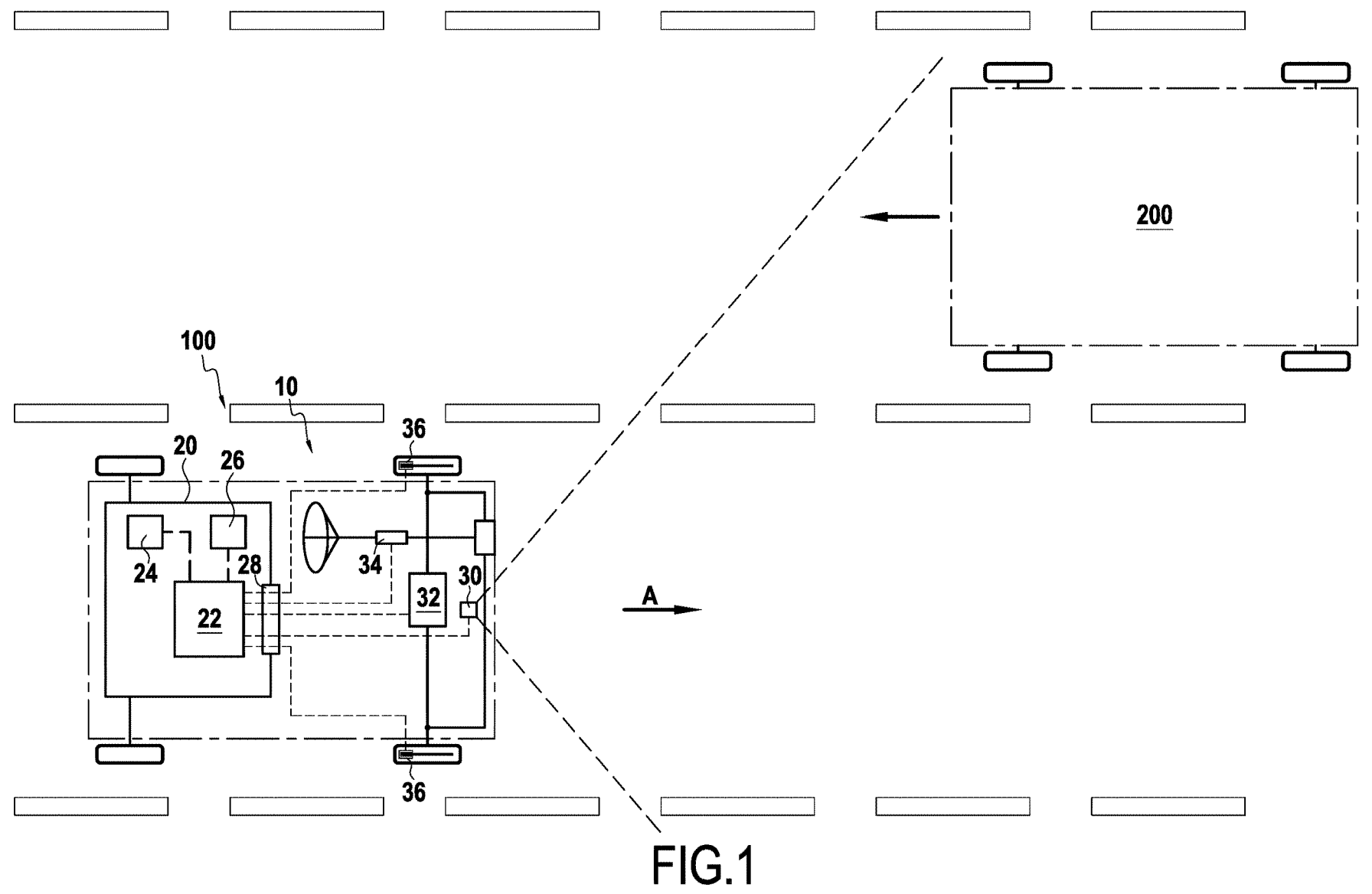

FIG. 1 schematically represents a car 100 equipped with an automated driving system 10 which forms an exemplary embodiment of a control system according to the present disclosure. Car 100 moves on a road (arrow A); in the opposite direction, another car 200 is coming, in the other lane.

The automated driving system 10 (or, in short, the system 10) comprises an object motion analysis system including an electronic control unit 20, a camera 30, as well as several other not represented sensors.

The images produced by camera 30 are transmitted to the electronic control unit 20 (ECU 20).

The ECU 20 has globally the hardware architecture of a computer. The ECU 20 comprises a processor 22, a random access memory (RAM) 24, a read only memory (ROM) 26, an interface 28.

The hardware elements of ECU 20 are optionally shared with other units of the automated driving system 10 and/or other systems of the car 100.

The interface 28 includes in particular a tactile display and various displays mounted in or on the dashboard of the car.

The interface 28 comprises a driver interface with a (not-shown) display to transmit information to the driver of the car 100, and interface connections with actuators and other vehicle devices of the car. In particular, interface 28 comprises a connection with several driving actuators of the car 100, namely, the engine 32, the steering column 34, and the brakes 36.

A computer program configured to partly assume the driving task by performing lateral and longitudinal control of the vehicle is stored in memory 26. This program is configured to calculate information relative to a relative speed between car 100 and the surrounding objects, detected in the images transmitted by camera 30. This program is further configured to output the commands which, at least during some driving periods, control driving actuators of the host vehicle.

This program, and the memory 26, are examples respectively of a computer program and a non-transitory computer-readable medium pursuant to the present disclosure.

The read-only memory 26 of the ECU 20 indeed constitutes a non-transitory computer readable medium according to the present disclosure, readable by the processor 22. It stores instructions which, when executed by a processor, cause the processor 22 to perform the control method according to the present disclosure.

More specifically, the program stored in memory 26 includes instructions for executing a method for controlling several devices of the vehicle 100 based on information relative to a relative speed between the vehicle and the 'independently moving objects' (IMO) moving outside the vehicle. In the present embodiment, the car 200 coming in the opposite direction is taken as an example of an IMO outside vehicle 100. In the present embodiment, the automated driving system 10 constitutes an exemplary object motion analysis system according to the present disclosure.

To perform its function, system 10 uses the images provided by camera 30, processes these images in ECU 20, and controls the vehicle 100 on the basis of information relative to a relative speed between the vehicle and the 'independently moving objects' detected around the vehicle, calculated by ECU 20.

Figure 3:
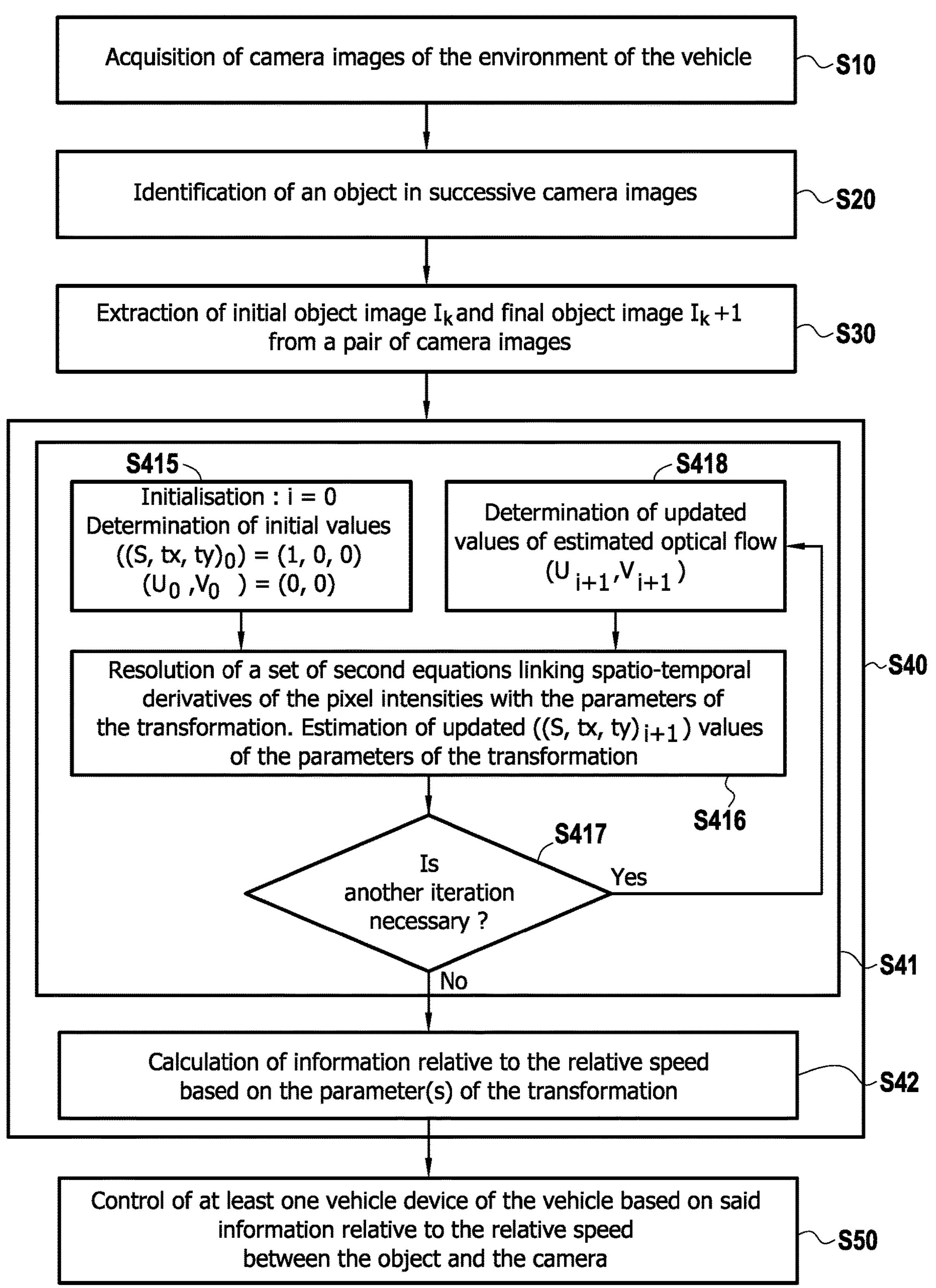
FIG. 3 is a block diagram showing steps of a method for determining information relative to a relative speed between a moving object and the camera of a vehicle according to a second embodiment of a method according to the present disclosure.

In accordance with the present disclosure, the vehicle 100 can be controlled during driving pursuant in particular to one of the control methods illustrated by FIGS. 2 and 3, which represent exemplary embodiments of a control method according to the present disclosure.

In the control method of FIG. 2, the parameter(s) of the transformation transforming an initial image into the final image are calculated in a direct, two-step method. By contrast, in the control method of FIG. 3, this or these parameter(s) are calculated iteratively.

The steps of the control methods illustrated by FIGS. 2 and 3 will now be described.

Steps S10-S30: Preparation

In the control methods illustrated by FIGS. 2 and 3, the control method first comprises the following preparation steps:

- S10) Camera images of the environment of the vehicle are acquired successively by camera 30. For each of these successive acquisitions, the value of a main index k is incremented. In practice, camera 30 continuously monitors the scene in front of car 100, and thus transmits image frame at a rate of 30 frames per second to the electronic control unit 20.
- S20) In each of these images, the electronic control unit identifies the objects which are present. This identification is made using neural network and focuses in identifying in particular pedestrians, other vehicles, etc.

In the present example, an upcoming car 200 is identified in successive images transmitted by camera 30.

- S30) When an object has been identified in an image, the image of the object is extracted from the camera image. In this purpose, a bounding box is determined for the object in each of these camera images. A sub-image showing the object in the image is then cropped out from the camera image so as to be defined by the bounding box of the object.

Pursuant to this process, two images ($I_k$ and $I_{k+1}$ in the present example, where k and k+1 correspond to two successive acquisitions of camera 30) are thus extracted from frames acquired by camera 30, and represent an initial image and a final image of the object with the meaning of the present disclosure.

Each of these images forms a matrix of pixel intensities I(x, y).

Step S40: Calculation of Information Relative to a Relative Speed

S40) Then, information relative to a relative speed between the object and the camera is calculated in two steps S41 and S42.

Step S41

At step S41, the optical flow F between the two images $I_k$ and $I_{k+1}$ is determined; then, once the optical flow F has been determined, the parameter(s) of the transformation transforming the initial image ($I_k$) into the final image ($I_{k+1}$) are calculated using the optical flow F.

The optical flow defines, for pixels (x, y) of the initial image ($I_k$), an estimated motion (u, v) of the pixels between the initial image ($I_k$) and the final image ($I_{k+1}$). As mentioned before, generally speaking, the optical flow is defined by a function F which provides (u, v) as a function of (x, y):

$$(u,v)=F(x,y)$$

In this expression, the couple (x, y) represents the coordinates of a pixel in the initial image. Usually, the optical flow is modelled by making some assumptions to simplify calculations.

In some embodiments, for instance the embodiments considered here in relation with FIGS. 2 and 3 (other possibilities are of course possible within the scope of the present disclosure), it is assumed that the transformation of the image is a $$\begin{cases} x + u = s \cdot x + tx \\ y + v = s \cdot y + ty \end{cases} \quad (1)$$

similarity of ratio s combined with a translation (tx, ty). Therefore, the position of a transformed pixel is defined by the following equations:

More generally, in the methods according to the present disclosure, any kind of function can be used to define the transformation of the image. For instance, the transformation can be defined as a perspective transformation, an affine transformation, a rotation of the rigid object combined with a translation, etc.

Accordingly, in the present embodiment the optical flow F is expressed by the set of equations (1') below, which is equivalent to system (1):

$$\begin{cases} u = (s - 1) \cdot x + tx \\ v = (s - 1) \cdot y + ty \end{cases} \quad (1)$$

The system (1') can be established for any pixel (x, y) of the initial image whose optical flow (u, v) can be calculated.

Step 41 can be implemented in different ways. Two example implementations of step S41 will be presented in more detail below: the 'direct method', illustrated by FIG. 2, and the 'iterative method', illustrated by FIG. 3.

Step S41—Direct Method (FIG. 2)

In this implementation of the control method, step S41 comprises two sub-steps.

In a first sub-step S411, the optical flow F is determined. Here, the optical flow F can be calculated using any known method.

Then, in a sub-step S412, the parameter(s) of the transformation are determined.

For instance, if the transformation is a similarity combined with a translation, defined by parameters s,tx,ty as envisaged above, by combining all systems (1') established for all the pixels (x, y) of the initial image whose optical flow could be calculated, a large set of equations is obtained. This set of equations comprises only three unknowns, s, tx and ty.

This set of equations is solved during step S412 by any known method. It can be solved for instance classically by a least squares method; however, in some examples, a robust fitting method is used, for instance a RANSAC method, an IRLS method, etc.

Step S41—Iterative Method (FIG. 3)

At step S41 as mentioned before, the parameter(s) (s,tx, ty) of the transformation is or are determined, based on an initial image ($I_k$) and a final image ($I_{k+1}$).

In this implementation of step S41, step S41 comprises an initialization sub-step S415, followed by several sub-steps which are executed iteratively. At each iteration, an index i, which is the index of the local loop nested in step S41, is incremented.

First, in the initialization step S415 (i=0), initial values are set for the estimated optical flow F.

In the iterative method, the optical flow F is constrained (or defined) by the parameter(s) of the transformation. The initialization of the flow is therefore carried out by initializing the parameter(s) of the transformation.

Accordingly, the initialization consists in setting initial values for the parameter(s) for the transformation. In the present exemplary embodiment, the following values can for instance be chosen:

$$(s,tx,ty)_0=(1,0,0).$$

Consequently, $u_0=v_0=0$ for each pixel in the sub-image (Here, in the variables $(s, tx, ty)_0$, $u_0$ and $v_0$, the subscript refers to i, with i=0).

The initialization of the optical flow is not restricted to $u_0=v_0=0$. Any reasonable initial values of $u_0$ and $v_0$ may be used. For instance, it is possible to initialize their values by executing the above-described direct method.

Then, in a step S416, updated values $(s, tx, ty)_{i+1}$ of the parameter(s) of the transformation are calculated.

In application of the principle of the 'bi-local algorithm' presented before, step S416 is based on the following calculations:

For the pixels of the initial image $I_k$ where they can be calculated, bi-local spatial derivatives are introduced, which are denoted as $$\nabla'_x I$$

and $$\nabla'_y I,$$

for the current iteration i, and are defined as follows:

$$\nabla'_x I(x, y) = (\nabla_x I_k(x, y) + \nabla_x I_{k+1}(x + u_i, y + v_i))/2 \quad (2a)$$

$$\nabla'_y I(x, y) = (\nabla_y I_k(x, y) + \nabla_y I_{k+1}(x + u_i, y + v_i))/2 \quad (2b)$$

In the above equations, the values $u_i$, $v_i$ are the values of the optical flow F for the current iteration (for the pending value of index i).

In addition, the following bi-local temporal derivative $$\nabla''_t$$

is also introduced. It is defined as follows:

$$\nabla''_t I_k(x, y) = I_{k+1}(x + u_i, y + v_i) - I_k(x, y) - \nabla'_x I(x, y) \cdot x - \nabla'_y I(x, y) \cdot y \quad (2c)$$

The above bi-local temporal derivative $$\nabla''_t$$

can also be expressed in simplified form as follows:

$$\nabla''_t I_k = I_{k+1}(x + u_i, y + v_i) - I_t(x, y) - \nabla'_x I \cdot x - \nabla'_y I \cdot y$$

The bi-local spatial derivatives $$\nabla'_x I$$

and $$\nabla'_y I,$$

and the bi-local temporal derivative $$\nabla''_t I,$$

are examples of spatio-temporal information according to the present disclosure.

On the numerical side, for the implementation, the above spatial gradients $$\nabla'_x I$$

and $$\nabla'_y I$$

are evaluated by a simple [−1, 0, 1] convolution mask. The evaluation of the spatio-temporal information at $(x+u_i, y+v_i)$ is carried out using bilinear interpolation.

In order to formulate the bi-local optical flow, the basic (local) optical flow equation is used, based for instance on the Horn-Schunck algorithm, to express the conservation of brightness intensity of a pixel across successive frames. This yields:

$$\nabla_x I(x,y)\cdot u+\nabla_y I(x,y)\cdot v+\nabla_t I(x,y)=0. \tag{2d$_1$}$$

Of course, other criteria than the conservation of brightness intensity of a pixel across frames can be used to calculate the bi-local formulation (which defines the second equations $2d_1$).

As an example, it is possible to add the possibility of an additive and multiplicative scaling on the intensity change. Furthermore, the Horn and Schunck equation above only models first-order effects, ignoring the higher order terms in the Taylor expansion (equation $2d_2$). Also from this perspective it is possible to add second and higher order terms in to the optical flow equation.

Given an estimate $(u_i, v_i)$ of the optical flow at a considered pixel, the above equation $(2d_1)$ can be reformulated using the current frame $I_k$ and the next frame $I_{k+1}$, the next frame $I_{k+1}$ being 'warped' with this initial estimate. The bi-local optical flow equation can thus be formulated as follows, where the equation $(2d_1)$ is applied to the residual flow $(u-u_i, v-v_i)$:

$$\nabla_x I(x,y)\cdot(u-u_i)+\nabla_y I(x,y)\cdot(v-v_i)+I_{k+1}(x+u_i,y+v_i)-I_k(x,y)=0 \tag{2d}$$

The above equation is explained as follows:

Note: In the description below, optical flow estimates are noted $\vec{u}'$, without referring to the iterative procedure, since the mathematical description is generic and does not depend on the iteration.

Let us consider the vectors $\vec{x}=(x, y)$, $\vec{u}=(u, v)$, and an intensity image I that translates over a distance u and is being observed at location $\vec{x}$ in two consecutive frames k and k+1 (the analysis is presented here for two frames, but can be applied to more than two frames):

The rule of conservation of the brightness across successive frames imposes that $I_{k+1}(\vec{x})=I_k(\vec{x}-\vec{u})$. For small displacements the Taylor expansion can be used to approximate this equation as and thus, $$I_{k+1}(\vec{x})=I_k(\vec{x})-\nabla I_k(\vec{x})\cdot\vec{u}+O(\nabla^2 1)$$

$$I_{k+1}(\vec{x})-I_k(\vec{x})+\nabla I_k(\vec{x})\cdot\vec{u}+O(\nabla^2 1)=0 \tag{2d$_2$}$$

When omitting the second order effects, equation $(2d_2)$ is equivalent to the 1D equation $\nabla I_k(\vec{x})\cdot\vec{u}+\nabla_t I(\vec{x})=0$, which is equivalent to the scalar formulation of equation $(2d_1)$ relating the spatial and temporal information at x. The temporal gradient $\nabla_t$ expresses the change of intensity between two chosen consecutive frames.

In addition, starting from equation $(2d_2)$, one can also consider k+1 as reference and express an observed motion −u from frame k+1 to k, i.e. $I_k(\vec{x})=I_{k+1}(\vec{x}+\vec{u})$. This yields:

$$I_k(\vec{x})-I_{k+1}(\vec{x})-\nabla I_{k+1}(\vec{x})\cdot\vec{u}+O(\nabla^2 1)=0 \tag{2d$_3$}$$

From $(2d_2)$ and $(2d_3)$, it follows that: $\nabla I_k=\nabla I_{k+1}$, which confirms that under brightness conservation hypothesis, the gradients remain constant.

Given an estimate $\vec{u}'$ for the actual motion $\vec{u}$, and $\overrightarrow{du}=\vec{u}'-\vec{u}$ the residual motion, it follows from equation $(2d_2)$ and $(2d_3)$:

$$I_{k+1}(\vec{x})-I_k(\vec{x})+\nabla I_k(\vec{x})\cdot\left(\vec{u}'+\overrightarrow{du}\right)=0 \tag{2d$_4$}$$

$$I_{k+1}(\vec{x})+\vec{u}'\cdot\nabla I_k(\vec{x})-I_k(\vec{x})-\nabla I_k(\vec{x})\cdot\overrightarrow{du}=0$$

$$I_{k+1}(\vec{x})+\vec{u}'\cdot\nabla I_{k+1}(\vec{x})-I_k(\vec{x})+\nabla I_k(\vec{x})\cdot\overrightarrow{du}=0$$

$$I_{k+1}\left(\vec{x}+\vec{u}'\right)-I_k(\vec{x})+\nabla I_k(\vec{x})\cdot\overrightarrow{du}=0$$

$$I_{k+1}\left(\vec{x}+\vec{u}'\right)-I_k(\vec{x})+\nabla I_k(\vec{x})\cdot\overrightarrow{du}$$

$$I_{k+1}\left(\vec{x}+\vec{u}'\right)=I_k\left(\vec{x}-\overrightarrow{du}\right) \tag{2d$_5$}$$

Equation $(2d_4)$ formulates a bi-local relationship between the residual motion $\overrightarrow{du}$, and the spatio-temporal information at $I_{k+1}(\vec{x}+\vec{u})$ and $I_k(\vec{x})$.

In this formulation, there is the implicit assumption that $\overrightarrow{du}$ is small, but there is no constraint on the magnitude of $\vec{u}'$ or $\vec{u}$. Equation $(2d_5)$ describes the equivalent forward/backward warping between frames $I_k$ and $I_{k+1}$ with respective motions $\vec{u}'$ and $\overrightarrow{du}$.

Equation $(2d_4)$ is equivalent to a scalar formulation of equation (2d).

The above equations can then be simplified by replacing therein the optical flow (u, v) by its expression as a function of (x, y) and the parameter(s) of the transformation. In the proposed embodiment, the transformation is the similarity transformation defined by equations (1), whose parameters are (s, tx, ty).

Consequently, the bi-local optical flow equation (2d) can be formulated in terms of parameters (s, tx, ty) as:

$$s\cdot\left(\nabla'_x I\cdot x+\nabla'_y I\cdot y\right)+tx\cdot\nabla'_x I+ty\cdot\nabla'_y I+\nabla''_t I=0 \tag{2d'}$$

The equations (2d') constitute second equations with the meaning of the present disclosure.

These second equations are written for all pixels where they can be calculated. A set of equations is thus obtained, which expresses relationships between spatio-temporal information about the pixel intensities I at considered pixels, spatio-temporal information about the pixel intensities I at another pixel for each of said considered pixels, and the parameter(s) (s, tx, ty) of the transformation.

More specifically, for each of said considered pixels, these second equations express a relation between spatio-temporal information in the initial image $I_k$ at said considered pixel ($\vec{x}$), and spatio-temporal information at said another pixel ($\vec{x}+\vec{u}$) in the final image ($I_{k+1}$).

Said another pixel is offset from the considered pixel by an estimated offset value, which is based on a current value ($u_i$, $v_i$) of the optical flow for the considered pixel. In the present embodiment, the estimated offset value is equal to the current estimate ($u_i$, $v_i$) of the optical flow.

The set of equations (2d') is a linear system (for parameters (s, tx, ty)) and is then solved by any appropriate method, thereby providing a new (or updated) estimate $(s, tx, ty)_{i+1}$ for the parameters s, tx and ty of the transformation.

Then, based on this updated estimate $(s, tx, ty)_{i+1}$, and using equations (1'), the updated value ($u_{i+1}$, $v_{i+1}$) of the optical flow is calculated.

Then, at step S417 th new estimate for the parameters $(s, tx, ty)_{i+1}$ is compared with the prior estimate $(s, tx, ty)_i$. If the difference exceeds a predetermined threshold, it is concluded that the algorithm has not converged yet.

The algorithm therefore jumps to step S418. In step S418, updated values ($u_{i+1}$, $v_{i+1}$) are calculated for the optical flow, based on equations (1'), for each pixel (x, y) of the initial image where these values can be calculated.

Then, the algorithm continues at step S416, described above.

Conversely, if at step S417, it is determined that the difference between $(s, tx, ty)_{i+1}$ and $(s, tx, ty)_i$ is below the predetermined threshold, it is concluded that the algorithm has sufficiently converged. It is therefore concluded that the values $(s, tx, ty)_{i+1}$ are the values of the parameter(s) of the transformation transforming the initial image into the final image.

Step S42

The algorithm then continues at step S42.

In step S42, the values of the parameter(s) of the transformation calculated at step S412 are used to calculate information relative to a relative speed between the object and the camera.

This information can be very simple. For instance, depending on the value of the similarity ratio s, it can be determined whether the detected object is moving away (s<1) or toward (s>1) the vehicle. Such information is information relative to the relative speed between the vehicle and the object and is sometimes sufficient to decide to stop tracking the object (if it moves away), or conversely to increase the level of attention paid to the object, if it gets closer.

Actually, the similarity ratio s is the visual expansion parameter: it characterizes how fast the image of the object grows or conversely shrinks in the images acquired by camera 30.

As another information relative to a relative speed between the object and the camera which can be possibly extracted from the parameter(s) of the transformation, based on the similarity ratio s and an estimate D (which can be a rough estimate) of the distance from the vehicle 100 to the car 200, the relative velocity in depth RVD of the object relative to the vehicle can be calculated using the following formula:

$$\mathrm{RVD}=D\cdot(1-s)/(T_1-T_0)$$

where $T_0$ and $T_1$ are the instants at which the initial image $I_k$ and the final image $I_{k+1}$ were acquired.

As another information relative to a relative speed between the object and the camera which can be possibly extracted from the parameter(s) of the transformation, based on the relative velocity in depth RVD, the time to collision with the object (the car 200) can be estimated using formula below:

$$TtC=D/\mathrm{RVD}$$

It is further possible to consider the above equations of RVD and TtC over different time steps $T_0, \ldots, T_n$, assuming for instance a constant relative velocity over the period. This combination leads to a set of equations:

$$\mathrm{RVD}=D_0\cdot(1-s_k)/(T_k-T_0),\ k=1, \ldots, n$$

in which $s_k$ are the expansion rates at the different time steps $T_k$, k=1, . . . , n, and are all calculated relative to the initial frame at $T_0$.

This joint homogeneous set of equations is then directly solved to calculate TtC: Being given an estimate for D, RVD is calculated as:

$$\mathrm{RVD}=D/TtC.$$

This particular formulation stabilizes the numerical output of D and RVD through TtC.

Moreover, in addition to the relative velocity RVD, the relative acceleration RAC can possibly also be taken into account in the formulation to calculate the time to collision TtC.

In this case, the velocity is not supposed to be constant; the distance $D_k$ to the object over different time steps $T_0, \ldots, T_n$, and given the expansion $s_k$ for each time step, can be expressed by $$D_k=D_0-\mathrm{RVD}(T_k-T_0)-\mathrm{RAC}(T_k-T_0)^2/2=s_kD_0$$

(The above equation can be considered as a Taylor expansion of the kinematic behavior of the car: It is of course possible to include additional term(s)).

The above homogeneous set of equations can be solved to determine the values of RVD/D and RAC/D. Since there are two unknowns, at least 3 observations (e.g. k=1, 2, in addition to 0 used as reference) must be used to arrive at a solution.

If a proper estimate exists for the distance $D_0$ (e.g. through means of the car width and camera intrinsics), the time to collision TtC can then be calculated based on the values of RVD and RAC.

Final Step S50: Control of at Least One Vehicle Device

S50) Finally, the electronic control unit 20 outputs commands to control at least one vehicle device (32, 34, 36) of car 100, based on said information relative to the relative speed between the object and the camera, for instance based the visual expansion s, the relative velocity in depth RVD of car 200, and/or the time-to-collision TtC with car 200.

Although the embodiments of the methods according to the present disclosure have been presented only with respect to the acquisition of two images of an object, derived from camera images acquired by a (single) camera, it should be understood that these methods are usually implemented iteratively, on the basis of a succession of images acquired at successive time steps by one or more cameras.

Accordingly, in some embodiments, step S41 can be executed several times, based on multiple pairs of initial and final image. Several values of the parameter(s) of the transformation are thus obtained. Then, at step S42, the information relative to a relative speed between the object and the camera can be calculated based on these different values.

In addition, the above-defined methods can be executed to calculate information relative to a relative speed between an object and a camera based not only on a single camera, but based on a plurality of (two or more) cameras. In this case, all the cameras must be maintained in a fixed position relative to each other. In addition, the cameras must have overlapping fields of views, so that the object appear in the images of the different cameras.

In this case, step S41 can be executed based on pairs of initial and final images, wherein said pairs of initial and final images are based on camera images of the different cameras. Several values of the parameter(s) of the transformation are thus obtained. Then, at step S42, the information relative to a relative speed between the object and the camera can be calculated based on these different values.

The invention claimed is:

1. A computer-implemented method for calculating information relative to a relative speed between an object and a camera, based on an initial image ($I_k$) and a final image ($I_{k+1}$) of the object, derived from image frames outputted by the camera, the method comprising:

determining a value of an optical flow (F) between the initial image ($I_k$) and the final image ($I_{k+1}$), the optical flow defining, for pixels (x, y) of the initial image, an estimated motion (u, v) thereof during a transformation transforming the initial image ($I_k$) into the final image ($I_{k+1}$); and, altogether with or after the determination of the value the optical flow, determining at least one parameter (s, tx, ty) of the transformation, using the optical flow; and calculating information (RVD, TtC) relative to a relative speed between the object and the camera, based on said at least one parameter (s, tx, ty) of the transformation, wherein a transformed pixel being a pixel obtained by applying the transformation to a corresponding antecedent pixel;

coordinates of a transformed pixel being therefore obtained by adding a value (u, v) of the optical flow F for the corresponding antecedent pixel to coordinates (x, y) of the corresponding antecedent pixel;

a first equation being an optical flow equation expressing the coordinates (x+u, y+v) of a transformed pixel as a function of the coordinates (x, y) of a corresponding antecedent pixel, using said at least one parameter (s, tx, ty) of the transformation;

a second equation being an optical flow equation expressing, for a considered pixel (x, y), a relationship between spatio-temporal information $$\left(\nabla'_x I, \nabla'_y I, \nabla''_t I\right)$$

about pixel intensities I at the considered pixel, spatio-temporal information $$\left(\nabla'_x I, \nabla'_y I, \nabla''_t I\right)$$

about pixel intensities at another pixel which is offset from the considered pixel by an estimated offset value ($u_i$, $v_i$), and said at least one parameter (s, tx, ty) of the transformation;

the method further comprising:

determining initial value of said at least one parameter ($(s,tx,ty)_0$) of the transformation and the optical flow ($u_0$, $v_0$); and iteratively executing steps of:

determining updated values of said at least one parameter ($(s,tx,ty)_{i+1}$) of the transformation, by solving a set of second equations established for considered pixels of the initial image based on an estimated value ($u_i$, $v_i$) of the optical flow (F) for said considered pixels;

determining whether a new iteration has to be performed; and determining updated estimated values ($u_{i+1}$, $v_{i+1}$) of the optical flow (F) for said considered pixels, using a set of first equations for said considered pixels and the values of the at least one parameter of the transformation ($(s,tx,ty)_{i+1}$).

2. The computer-implemented method of claim 1, wherein said set of second equations, for each of said considered pixels, expresses a relation between spatio-temporal information in the initial image ($I_k$) at said considered pixel ($\vec{x}$), and spatio-temporal information at said another pixel ($\vec{x}+\vec{u}$) in the final image ($I_{k+1}$).

3. The computer-implemented method of claim 1, wherein the transformation is a similarity defined by transformation parameters s, tx, and ty; and the set of second equations is defined as:

$$s\cdot\left(\nabla'_x I\cdot x+\nabla'_y I\cdot y\right)+tx\cdot\nabla'_x I+ty\cdot\nabla'_y I+\nabla''_t I=0$$

in which for a current iteration i, bi-local spatial derivatives $$\nabla'_x I$$

and $$\nabla'_y I$$

and bi-local temporal derivatives $$\nabla''_t I$$

are defined as:

$$\nabla'_x I(x,y)=(\nabla_x I_k(x,y)+\nabla_x I_{k+1}(x+u_i,\,y+v_i))/2$$

$$\nabla'_y I(x,y)=(\nabla_y I_k(x,y)+\nabla_y I_{k+1}(x+u_i,\,y+v_i))/2$$

$$\nabla''_t I_k(x,y)=I_{k+1}(x+u_i,\,y+v_i)-I_k(x,y)-\nabla'_x I(x,y)\cdot x-\nabla'_y I(x,y)\cdot y$$

in which $u_i$, $v_i$ are values of the optical flow F for the current iteration i.

4. The computer-implemented method of claim 1, wherein the transformation is a perspective transformation, a similarity transformation(s) combined with a translation (tx,ty), an affine transformation, or a rotation of the object combined with a translation.

5. A control method for controlling at least one device, the control method comprising steps of:

acquiring camera images of an environment of at least one camera with said at least one camera;

identifying an object in at least a pair of said camera images acquired by one of said at least one camera;

extracting an initial image ($I_k$) and a final image ($I_{k+1}$) of the object, which are portions of said pair of camera images defined by a bounding box of said identified object;

calculating information (RVD,TtC) relative to a relative speed between an object and said at least one camera, using a method according to claim 1;

controlling said at least one device based on said information relative to the relative speed between the object and said at least one camera.

6. A non-transitory computer-readable medium storing instructions that, when executed by a processor, cause the processor to perform the steps of a method according to claim 1.

7. An object motion analysis system, the object motion analysis system comprising a processor configured, based on an initial image ($I_k$) and a final image ($I_{k+1}$) of the object, derived from image frames outputted by a camera:

to determine a value of an optical flow (F) between the initial image ($I_k$) and the final image ($I_{k+1}$), the optical flow defining, for pixels (x,y) of the initial image, an estimated motion (u,v) thereof during a transformation transforming the initial image ($I_k$) into the final image ($I_{k+1}$); and, altogether with or after the determination of the value the optical flow (u,v), to determine at least one parameter (s, tx, ty) of the transformation, using the optical flow; and to calculate information (RVD, TtC) relative to a relative speed between the object and the camera, based on said at least one parameter (s,tx,ty) of the transformation, wherein a transformed pixel being a pixel obtained by applying the transformation to a corresponding antecedent pixel, coordinates of a transformed pixel being therefore obtained by adding a value (u(x,y), v(x,y)) of the optical flow F for the corresponding antecedent pixel to coordinates (x, y) of the corresponding antecedent pixel;

a first equation being an equation expressing the coordinates (x+u,y+v) of a transformed pixel as a function of the coordinates (x, y) of a corresponding antecedent pixel, using said at least one parameter (s, tx, ty) of the transformation;

a second equation being an optical flow equation expressing, for a considered pixel (x, y), a relationship between spatio-temporal information $$(\nabla'_x I, \nabla'_y I, \nabla''_t I)$$

about pixel intensities at the considered pixel, spatio-temporal information $$(\nabla'_x I, \nabla'_y I, \nabla''_t I)$$

about pixel intensities I at another pixel which is offset from the considered pixel by an estimated offset value ($u_i$, $v_i$), and said at least one parameter (s,tx,ty) of the transformation; the processor is configured to execute an initial step of:

determining initial values of said at least one parameter ($(s,tx,ty)_0$) of the transformation and the optical flow ($u_0$, $v_0$); and the processor is configured to further iteratively execute steps of:

determining updated values of said at least one parameter ($(s,tx,ty)_{i+1}$) of the transformation, by solving a set of second equations established for considered pixels of the initial image, and based on an estimated value ($u_i$, $v_i$) of the optical flow F for said considered pixels;

determining whether a new iteration has to be performed; and determining updated estimated values ($u_{i+1}$, $v_{i+1}$) of the optical flow F for said considered pixels, using a set of first equations for said considered pixels and the values of the at least one parameter of the transformation ($(s, tx, ty)_{t+1}$).

8. The object motion analysis system according to claim 7, wherein the processor is configured to solve said set of equations by robust fitting a linear model-using a RANSAC method or an IRLS method.

9. The object motion analysis system according to claim 7, wherein the transformation is a perspective transformation, a similarity transformation(S) combined with a translation (tx, ty), an affine transformation, or a rotation of the object combined with a translation.

10. A control system comprising the object motion analysis system according to claim 7, wherein the control system comprises the camera;

the processor is configured:

to acquire camera images of an environment of the camera with the camera;

to identify the object in at least a pair of said camera images acquired by the camera;

to extract the initial image ($I_k$) and the final image ($I_{k+1}$) of the object, which are portions of said pair of camera images defined by a bounding box of said identified object; and to control at least one device of the control system based on said information relative to the relative speed between the object and the camera.

11. The computer-implemented method of claim 1, wherein:

the camera is equipped in a vehicle:

the at least one parameter (s, tx, ty) includes a similarity of ratio(s); and the calculating the information (RVD, TtC) relative to the relative speed between the object and the camera, based on said at least one parameter (s, tx, ty) of the transformation comprises calculating a relative velocity in depth (RVD) of the object relative to the vehicle and a time to collision (TtC) between the vehicle and the object, based on the similarity of ratio(s), instant (To) at which the initial image ($I_k$) was acquired and instant ($T_1$) at which the final image ($I_{k+1}$) was acquired, and an estimate (D) of a distance from the vehicle to the object.

12. The object motion analysis system of claim 7, wherein:

the camera is equipped in a vehicle;

the at least one parameter (s, tx, ty) includes a similarity of ratio(s); and the processor is configured to calculate the information (RVD, TtC) relative to the relative speed between the object and the camera, based on said at least one parameter (s,tx,ty) of the transformation by being configured to calculate a relative velocity in depth (RVD) of the object relative to the vehicle and a time to collision (TtC) between the vehicle and the object, based on the similarity of ratio(s), instant ($T_0$) at which the initial image ($I_k$) was acquired and instant ($T_1$) at which the final image ($I_{k+1}$) was acquired, and an estimate (D) of a distance from the vehicle to the object.

* * * * *